Patented May 4, 1948

2,440,985

UNITED STATES PATENT OFFICE 2,440,985

VINYL RESINS CONTAINING ALKENYL SUCCINIC ESTERS AND METHOD OF MAKING

Leslie T. Sutherland, Yonkers, N. Y., assignor to Allied Chemical & Dye Corporation, New York, N. Y., a corporation of New York No Drawing. Application April 13, 1944, Serial No. 530,947

14 Claims. (Cl. 260—36)

This invention relates to a process of compounding vinyl resins and to the resultant compositions.

Vinyl resins possess a combination of desirable properties which have been responsible for employment of the resins for a wide variety of uses; for example, these resins are commonly employed for applications requiring resistance to oxidation and to the action of organic solvents and chemical inertness in the presence of common reagents such as acids and alkalies. In order to improve the processing properties of the resins and impart flexibility to the products made therefrom, it is customary to employ plasticizers in the resinous compositions. Numerous compounds, particularly esters, have been proposed as plasticizers in patent and other literature. In order to function satisfactorily as plasticizers for vinyl resins, the compounds employed should be compatible with the resin in amounts sufficient to impart the desired processing properties thereto, the compounded resinous products should possess satisfactory tensile properties and flexibility over a wide temperature range, and should not be subject to excessive loss of the plasticizer when subjected for prolonged periods to the temperatures encountered in use. Thus, a plasticizer for vinyl resin compositions intended for general use must be capable of imparting a complex combination of properties to the compositions. While many compounds impart one or more desirable properties to vinyl resins, comparatively few have been found which satisfy the various exacting requirements necessary for practical general use.

This invention is based on the discovery that use of a special class of esters as plasticizers for vinyl resin compositions impart to the compositions excellent flexibility over a wide temperature range, high tensile strength and ability to withstand elevated temperatures for prolonged periods of time without undue loss of the plasticizers by volatilization. The esters employed as plasticizers for vinyl resins in accordance with the invention are of alkenyl succinic acid esters containing at least 23, and preferably not more than 34, carbon atoms in the molecule, which esters may be represented by the following formula:

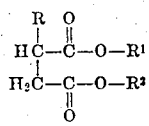

in which R is an alkenyl group containing from 3 to 14 carbon atoms and R¹ and R² are the same or different hydrocarbon radicals containing at least 5 carbon atoms. R¹ and R² may be the same or different alkyl, cycloalkyl, or aralkyl radicals. Esters in which R contains from 6 to 12 carbon atoms and R¹ and R² each contain not more than 8 carbon atoms are particularly preferred. The esters are made by reacting the corresponding alkenyl succinic acid anhydrides or acids with an aliphatic or alicyclic alcohol containing at least 5 carbon atoms, or an aromatic alcohol until esterification is substantially complete, i. e. until the desired diester is formed. The mixed esters may be made by esterifying the anhydrides or acids to the monoester stage by one of the alcohols and completing the esterification by reaction of the monoester with another alcohol or by using a mixture of such hydroxy compounds in carrying out the esterification.

Among the alcohols that may be employed in effecting the esterification are the normal and branched chain amyl, hexyl, heptyl and octyl alcohols, cyclohexanol, the methylcyclohexanols, benzyl alcohol and the methyl benzyl alcohols.

The alkenyl succinic acids or anhydrides utilized in making the esters may be prepared by reacting mono-olefins containing from 3 to 14 carbon atoms in the molecule, e. g. mono-olefinic cracked petroleum distillate fractions of appropriate boiling range, with maleic anhydride at an elevated temperature sufficiently high to promote the reaction, preferably above 200° C., under sufficient pressure to maintain the mono-olefins in the liquid phase. The anhydrides obtained from this reaction may be represented by the following formula:

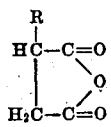

in which R is a straight or branched chain alkenyl radical containing a single double bond and from 3 to 14 carbon atoms. Use of a mixture of mono-olefins, such as cracked petroleum distillate, and esterification of the anhydrides thereby obtained, results in the production of a mixture of alkenyl succinic acid esters, the average number of carbon atoms in the alkenyl groups of which depends on the boiling range of the distillate fraction employed. By utilizing fractions of narrow boiling range, ester mixtures whose alkenyl groups do not vary greatly in size from the average group of the mixture may be obtained. Substantially pure mono-olefins, such as amylene, hexene or nonene, may be employed, if desired, to form a substantially pure ester, but it is usually more economical to utilize cracked petroleum distillate containing a mixture of mono-olefins as the mono-olefinic hydrocarbons. While it is preferred to esterify the anhydrides in making the esters, the anhydrides may first be hydrated to form the alkenyl succinic acids and the acids esterified to produce the esters.

The vinyl resins which may be plasticized in accordance with the invention include the various forms of polyvinyl chloride, particularly those which are insoluble in acetone, and copolymers of vinyl chloride and vinyl acetate, particularly such copolymers made by copolymerizing predominating amounts of vinyl chloride with smaller amounts of vinyl acetate.

Preferably, from 20 to 150 parts by weight of the plasticizer are utilized for each 100 parts of vinyl resins. Fillers and pigments such as whiting, channel black, clay, gum rosin, silica and others, and stabilizers such as litharge, other lead compounds, some oxides of the bismuth and barium types and some silicates may also be utilized. The use of such fillers, pigments and stabilizers is conventional practice and requires no further description.

The vinyl resin compositions may be compounded by means of conventional equipment such as mills of the heated roll type or internal mixers. The plasticizer and other compounding ingredients, such as filler and stabilizer, are worked into the vinyl resin so that they are thoroughly dispersed therein by means of such equipment, and the resultant composition then molded, calendered, extruded or otherwise formed into articles of the desired shape by conventional procedure.

The following examples are further illustrative of the invention:

approximately 4 minutes on a rubber mill at a roll temperature of 250° to 270° F. and the resultant compositions were molded in sheet form under heat and pressure. The compositions of Examples I and IV were molded for 10 minutes at 287° F. and the compositions of the remaining examples were molded for 20 minutes at 320° F. The molded compositions were subjected to tensile, aging, flexibility and weight loss tests. The results of these tests showed that the compositions possessed excellent properties. The results of the tests on the compositions of Examples II and III and on compositions which were similarly prepared except that, instead of dibenzyl alkenyl succinates, similar amounts of tricresyl phosphate were employed as plasticizer, are tabulated below:

|  | Example II | Composition containing 75 parts of tricresyl phosphate as plasticizer | Example III | Composition containing 100 parts of tricresyl phosphate as plasticizer |
|---|---|---|---|---|
| Tensile strength (pounds per sq. in.): |  |  |  |  |
| Unaged | 2,240 | 2,100 | 1,460 | 1,280 |
| Aged 14 days at 70° C | 2,200 | 2,000 | 1,470 | 1,200 |
| Elongation (per cent at breaking point): |  |  |  |  |
| Unaged | 360 | 340 | 340 | 370 |
| Aged 14 days at 70° C | 350 | 300 | 350 | 380 |
| Weight loss after aging 7 days at 70° C. (per cent by weight) | .1 | .3 | .1 | .3 |

The compositions of the examples remained flexible when chilled to 40° F. for 48 hours and exhibited substantially the same resistance to solvents such as water and petroleum hydrocarbons as vinyl resin compositions containing similar amounts of tricresyl phosphate.

The plasticizers of the invention may be utilized to advantage either alone or in conjunction with other plasticizers. Where they are employed in conjunction with other plasticizers, the properties of the plasticized compositions may be varied by using different kinds of other plasticizers and varying the amounts of the plasticizers.

Thus it will be seen the plasticization of polyvinyl chloride compositions by alkenyl succinates containing between 3 and 14 carbon atoms in the alkenyl groups imparts to the compositions excellent flexibility and tensile properties. Furthermore, the compositions are subject to only slight loss of the plasticizers by volatilization when subjected to elevated temperatures for prolonged periods of time. The compositions may be employed as rubber substitutes for many purposes. The plasticizers impart desirable processing prop-

| Example | I | II | III | IV | V | VI |
|---|---|---|---|---|---|---|
|  | Parts by weight | Parts by weight | Parts by weight | Parts by weight | Parts by weight | Parts by weight |
| Polyvinyl chloride | 100 | 100 | 100 | 100 | 100 | 100 |
| Dibenzyl alkenyl succinate | 40 | 75 | 100 |  |  |  |
| Dioctyl alkenyl succinate |  |  |  | 40 | 75 | 100 |
| Litharge | .5 | .5 | .5 | .5 | .5 | .5 |

The resin employed in these examples was a polyvinyl chloride which was a fine white powder having a specific gravity of about 1.41 and a refractive index of about 1.54; insoluble in water, alcohol, concentrated acid and alkali; soluble in mesityl oxide, dioxane and ethylene dichloride. The dibenzyl and dioctyl alkenyl succinates were formed by esterifying mixtures of alkenyl succinic acid anhydrides containing an average of 9.6 carbon atoms in the alkenyl groups. The litharge was employed as a stabilizer. The ingredients were mixed and the mixtures were milled for erties to vinyl resins and are compatible with the resins in relatively large amounts.

The tensile strengths and elongations given herein were determined by A. S. T. M. Test D412-41.

Since certain changes may be made without departing from the scope of the invention, it is intended that the above description shall be interpreted as illustrative and not in a limiting sense.

I claim:
1. A vinyl resin composition containing vinyl resin of the group consisting of polyvinyl chloride and a copolymer of vinyl chloride and vinyl acetate and a plasticizer of the following formula:

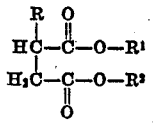

in which R is an alkenyl group containing from 3 to 14 carbon atoms, and $R^1$ and $R^2$ are hydrocarbon radicals containing at least 5 carbon atoms, said plasticizer containing from 23 to 34 carbon atoms per molecule.

2. A composition as defined in claim 1 in which $R^1$ and $R^2$ each contains from 5 to 8 carbon atoms.

3. A composition as defined in claim 1 in which R contains from 6 to 12 carbon atoms, and $R^1$ and $R^2$ each contains from 5 to 8 carbon atoms, said plasticizer being present in amount of from 20 to 150 parts by weight for each 100 parts by weight of the vinyl resin.

4. A composition as defined in claim 1 in which the resin is polyvinyl chloride.

5. A composition as defined in claim 1 in which the resin is a copolymer of vinyl chloride and vinyl acetate.

6. A plasticized composition containing 100 parts by weight of polyvinyl chloride and from 20 to 150 parts by weight of a mixture of dibenzyl alkenyl succinates containing from 6 to 12 carbon atoms in the alkenyl groups.

7. A plasticized composition containing 100 parts by weight of polyvinyl chloride and from 20 to 150 parts by weight of a mixture of dioctyl alkenyl succinates containing from 6 to 12 carbon atoms in the alkenyl groups.

8. In the compounding of a vinyl resin of the group consisting of polyvinyl chloride and a copolymer of vinyl chloride and vinyl acetate, the improvement which comprises working into said vinyl resin so as to thoroughly disperse it therein a plasticizer having the following formula:

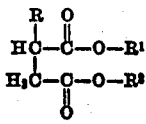

in which R is an alkenyl group containing from 3 to 14 carbon atoms, and $R^1$ and $R^2$ are hydrocarbon radicals containing at least 5 carbon atoms, said plasticizer containing from 23 to 34 carbon atoms per molecule.

9. A process as defined in claim 8 in which $R^1$ and $R^2$ each contains from 5 to 8 carbon atoms.

10. A process as defined in claim 8 in which R contains from 6 to 12 carbon atoms, and $R^1$ and $R^2$ each contains from 5 to 8 carbon atoms, said plasticizer being present in amount of from 20 to 150 parts by weight for each 100 parts by weight of the vinyl resin.

11. A process as defined in claim 8 in which the resin is polyvinyl chloride.

12. A process as defined in claim 8 in which the resin is a copolymer of vinyl chloride and vinyl acetate.

13. A process of compounding polyvinyl chloride which comprises working 100 parts by weight of the polyvinyl chloride with from 20 to 150 parts by weight of a mixture of dibenzyl alkenyl succinates containing from 6 to 12 carbon atoms in the alkenyl groups so as to thoroughly disperse the succinate mixture in the polyvinyl chloride mass.

14. A process of compounding polyvinyl chloride which comprises working 100 parts by weight of the polyvinyl chloride with from 20 to 150 parts by weight of a mixture of dioctyl alkenyl succinates containing from 6 to 12 carbon atoms in the alkenyl groups so as to thoroughly disperse the succinate mixture in the polyvinyl chloride mass.

LESLIE T. SUTHERLAND.

REFERENCES CITED

The following references are of record in the file of this patent:

UNITED STATES PATENTS

| Number | Name | Date |
| --- | --- | --- |
| 2,055,456 | Eichwald | Sept. 26, 1936 |
| 2,297,290 | D'Alelio | Sept. 29, 1942 |